United States Patent [19]
Asai

[11] Patent Number: 6,098,884
[45] Date of Patent: Aug. 8, 2000

[54] CIRCUIT STRUCTURE OF BAR CODE READER CAPABLE OF READING BAR CODE WITH DECREASED POWER CONSUMPTION

[75] Inventor: Nobuo Asai, Tokyo, Japan

[73] Assignee: Matsushita Electric Industrial Co., Ltd., Japan

[21] Appl. No.: 09/047,523

[22] Filed: Mar. 25, 1998

[30] Foreign Application Priority Data

Mar. 31, 1997 [JP] Japan .................................... 9-080139

[51] Int. Cl.[7] .................................................. G06K 7/10
[52] U.S. Cl. ..................... 235/462.3; 235/472; 235/655; 235/466
[58] Field of Search ........................... 235/462.3, 462.31, 235/462.32, 472, 455, 466

[56] References Cited

U.S. PATENT DOCUMENTS

| | | | |
|---|---|---|---|
| 3,790,756 | 2/1974 | Graves et al. ........................ | 235/61.11 |
| 4,859,840 | 8/1989 | Hasegawa et al. ...................... | 235/463 |
| 5,336,874 | 8/1994 | Hasegawa ................................ | 235/466 |
| 5,534,684 | 7/1996 | Danielson ................................ | 235/462 |
| 5,742,043 | 4/1998 | Knowles et al. ......................... | 235/472 |
| 5,895,908 | 4/1999 | Kawai et al. ......................... | 235/462.3 |

*Primary Examiner*—Thien M. Le
*Assistant Examiner*—Daniel S. Felten
*Attorney, Agent, or Firm*—Parkhurst & Wendel, L.L.P

[57] ABSTRACT

A bar code reader is provided which is designed to read a bar code with a decreased power consumption. The bar code reader includes a laser output cycle adjuster that determines a laser output cycle consisting of a laser on-duration in which a laser source is allowed to emit a laser beam and a laser off-duration in which the laser source is inhibited from emitting the laser beam. This prevents the laser beam from being outputted continuously when the bar code reader is distant from the bar code, and it is difficult to read the bar code correctly, thereby minimizing a power waste in the bar code reader.

13 Claims, 3 Drawing Sheets

CIRCUIT STRUCTURE OF BAR CODE READER CAPABLE OF READING BAR CODE WITH DECREASED POWER CONSUMPTION

BACKGROUND OF THE INVENTION

1. Technical Field of the Invention

The present invention relates generally to a bar code reader designed to read a bar code using a laser beam, and more particularly to an improved bar code reading apparatus capable of reading a bar code with decreased power consumption.

2. Background of Related Art

FIG. 3 shows a conventional bar code reader which includes a laser-emitting device consisting of a trigger switch 1, a laser controller 2, a laser source 3, a mirror driver 4, and a mirror 5. The trigger switch 1 is responsive to depression of a switch (not shown) to provide operation start signals to the laser controller 2 and the mirror driver 4 and activates them. The laser controller 2 outputs an excitation signal to the laser source 3. The laser source 3 emits a laser beam to the mirror 5. The mirror 5 includes, for example, a polygon reflector which is rotated by the mirror driver 4 to reflect the input laser beam for scanning a bar code printed on a bar code label 6 attached to an article.

The bar code reader also includes a laser-receiving device consisting of an optical sensor 7, a binary-coding circuit 8, a counter 9, a sampling clock generator 10, and a CPU 11. The optical sensor 7 consists of a photoelectric converter that converts an input laser beam reflected from the bar code label 6 into an electric analog signal according to the intensity of the laser beam. The binary-coding circuit 8 converts the analog signal outputted from the optical sensor 7 into a digital signal and outputs it to the counter 9. The counter 9 counts clock signals supplied from the sampling clock generator 10 according to the input digital signal to provide a numerical code signal indicative of the width of one of bars or spaces between the bars of the bar code and outputs it to the CPU 11. The CPU 11 decodes the numerical code signal to provide bar code information.

The above conventional bar code reader, however, has the drawback in that the laser source 3 continues to output a laser beam once turned on regardless of whether or not the bar code reader is at a location where it is possible to read the bar code correctly, and the CPU 11 decodes the numerical code signal each time it is outputted from the counter 9 regardless of whether the bar code has been picked up correctly or not. This wastes the power of the bar code reader.

SUMMARY OF THE INVENTION

It is therefore a principal object of the present invention to avoid the disadvantages of the prior art.

It is another object of the present invention to provide a bar code reader capable of reading a bar code correctly with a decreased power consumption.

According to one aspect of the present invention, there is provided a bar code reader which comprises: (a) a laser source that emits a laser beam; (b) a laser output cycle determining circuit that determines a laser output cycle consisting of a laser on-duration in which the laser source is allowed to emit the laser beam and a laser off-duration in which the laser source is inhibited from emitting the laser beam; (c) a scanner that scans a bar code using the laser beam emitted from the laser source to pick up bars and spaces between the bars of the bar code within the laser on-duration of the laser output cycle; (d) a code converting circuit that converts the bars and the spaces picked up by the scanner into numerical codes; and (e) a decoding circuit that decodes the numerical codes provided by the code converting circuit to produce bar code information.

In the preferred mode of the invention, the laser output cycle determining circuit is designed to change the laser output cycle in response to a signal provided manually. The laser output cycle determining circuit may alternatively be designed to change the laser output cycle automatically according to a change in number of the numerical codes derived by the code converting circuit.

A shock sensor is further provided which senses contact of the bar code reader with an article with a bar code label on which the bar code is printed to turn on the bar code reader.

A switch is further provided which is designed to activate the bar code reader in response to a manually provided turn-on signal.

A code number comparing circuit is further provided which compares the number of the numerical codes derived by the code converting circuit with a reference number. When the number of the numerical codes is smaller than the reference number, the code number comparing circuit provides a decoding inhibit signal to inhibit the decoding circuit from decoding the numerical codes. Alternatively, when the number of the numerical codes is greater than or equal to the reference number, the code number comparing circuit provides a decoding enable signal to allow the decoding circuit to decode the numerical codes.

A reference number adjusting circuit is further provided that changes the reference number.

A scan cycle detecting circuit is further provided that outputs a scan cycle signal at each start of scan cycles of the scanner. A controlling circuit is further provided that prohibits the code converting circuit from converting the bars and the spaces picked up by the scanner into the numerical codes in response to first one of the scan cycle signals outputted from the scan cycle detecting circuit after the code number comparing circuit provides the decoding enable signal to allow the decoding circuit to decode the numerical codes.

According to another aspect of the invention, there is provided a bar code reader which comprises: (a) a laser source that emits a laser beam; (b) a scanner that scans a bar code using the laser beam emitted from the laser source to pick up bars and spaces between the bars of the bar code; (c) a code converting circuit that converts the bars and the spaces picked up by the scanner into numerical codes, the code converting circuit also determining the number of the numerical codes; (d) a code number comparing circuit that compares the number of the numerical codes determined by the code converting circuit with a reference number, when the number of the numerical codes is smaller than the reference number, the code number comparing circuit providing a decoding inhibit signal, when the number of the numerical codes is greater than or equal to the reference number, the code number comparing circuit providing a decoding enable signal; and (e) a decoding circuit that is responsive to the decoding enable signal provided by the code number comparing circuit to decode the numerical codes and outputs signals indicative thereof, the decoding circuit being inhibited from decoding the numerical codes in response to the decoding inhibit signal.

In the preferred mode of the invention, a laser output cycle determining circuit is further provided that determines a laser output cycle consisting of a laser on-duration in which the laser source is allowed to emit the laser beam and a laser off-duration in which the laser source is inhibited from emitting the laser beam.

The laser output cycle determining circuit is designed to change the laser output cycle in response to a signal provided manually.

The laser output cycle determining circuit may alternatively be designed to change the laser output cycle automatically according to a change in number of the numerical codes derived by the code converting circuit.

A shock sensor is further provided which senses contact of the bar code reader with an article with a bar code label on which the bar code is printed to turn on the bar code reader.

A switch is further provided which is designed to activate the bar code reader in response to a manually provided turn-on signal.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
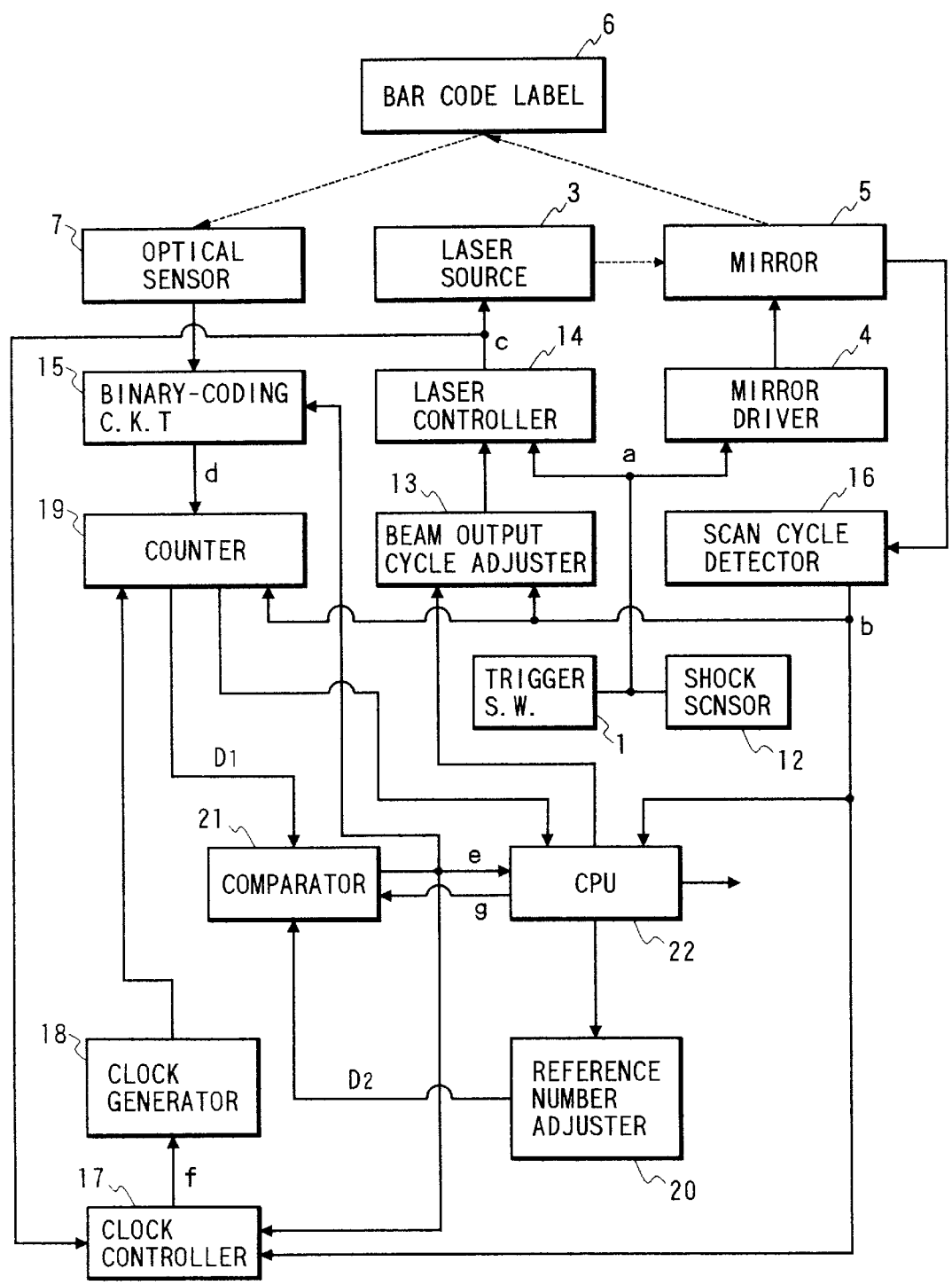
FIG. 1 is a block diagram which shows a bar code reader according to the present invention.

Referring now to the drawings, particularly to FIG. 1, there is shown a bar code reader according to the invention.

The bar code reader includes generally a CPU 22, a trigger switch 1, a shock sensor 12, a beam output cycle adjuster 13, a beam scan cycle detector 16, a laser controller 14, a mirror driver 4, a laser source 3, and a mirror 5.

The trigger switch 1 is responsive to turning on of a manual on/off switch (not shown) to provide operation start signals a to the laser controller 14 and the mirror driver 4 and activates them. The trigger switch 1 may be disposed away from the bar code reader body. The shock sensor 12 senses the shock produced when the bar code reader body contacts with an article to which a bar code label 6 is attached to output the operation start signals a to the laser controller 14 and the mirror driver 4. Specifically, the operation of the bar code reader is initiated manually using the manual on/off switch or automatically in response to contact of the bar code reader body with the bar code-attached article. The shock sensor 12 may use a shock sensor which is currently commercially available under the registered trademark "Piezotite".

Figure 2:
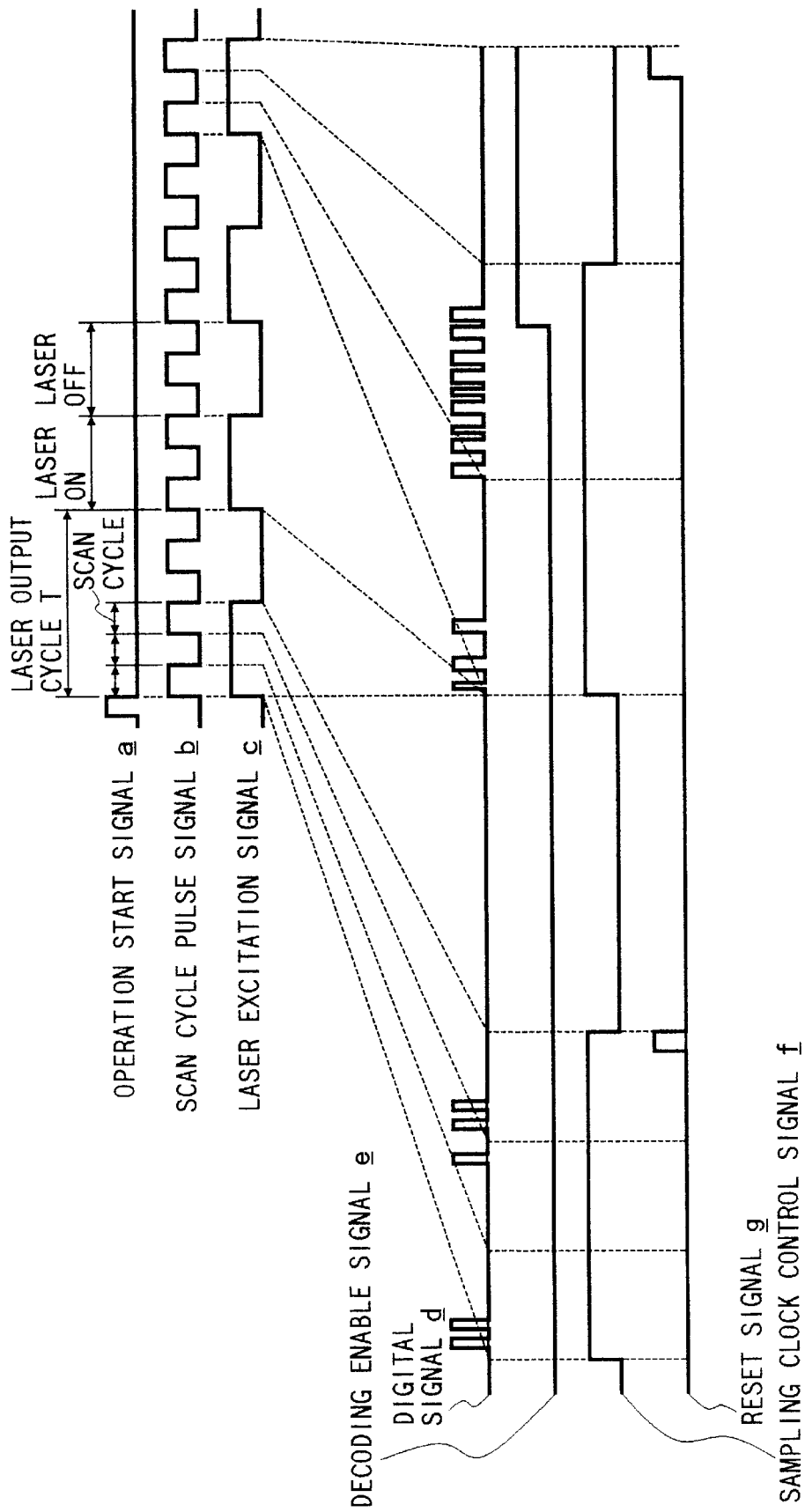
FIG. 2 is a time chart which shows an operation of the bar code reader in FIG. 1.
Figure 3:
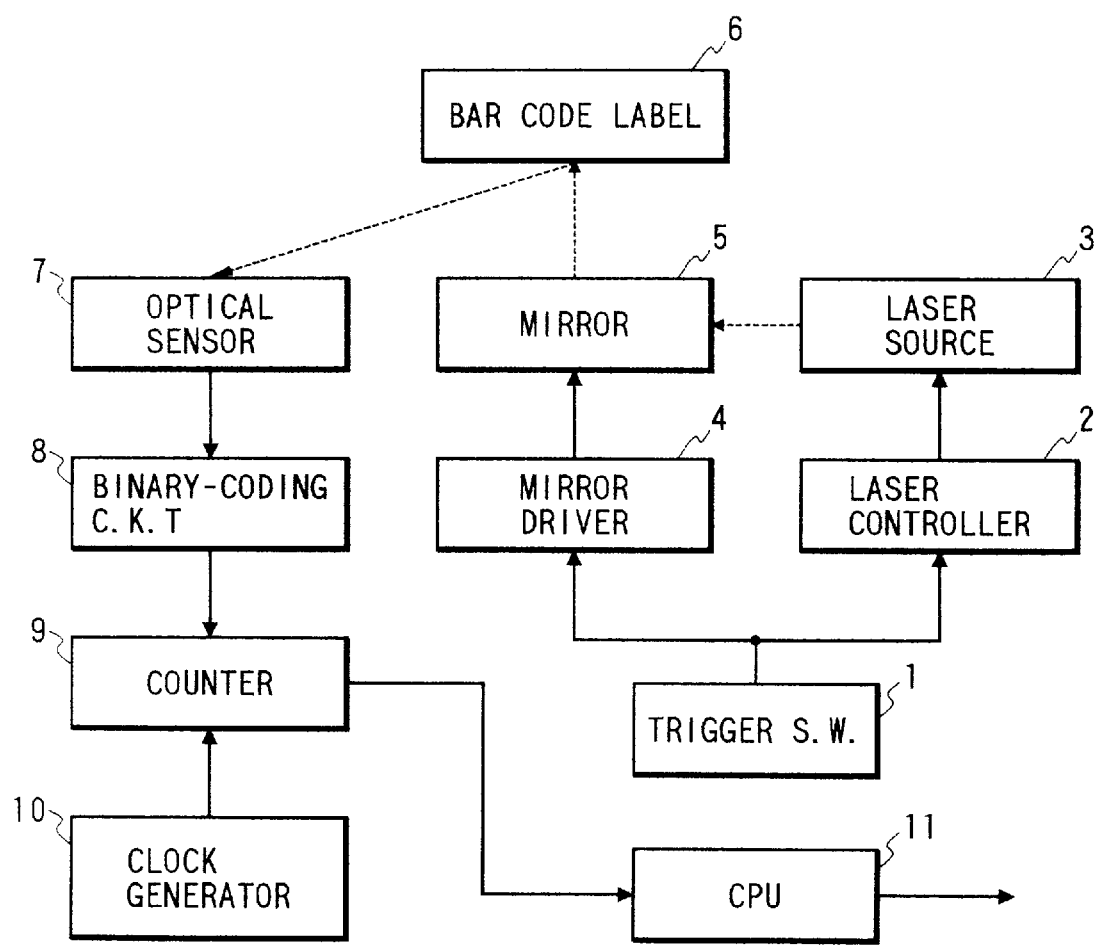
FIG. 3 is a block diagram which shows a conventional bar code reader.

The beam output cycle adjuster 13 is designed to adjust a laser output cycle T, as can be seen in FIG. 2, consisting of a period of time during which a laser beam is radiated from the laser source 3 (i.e., a laser on-duration) and a period of time during which the radiation of the laser beam is interrupted (i.e., a laser off-duration) in response to a cycle adjustment signal outputted from the CPU 22. The laser output cycle T may be changed manually or automatically. For instance, an operator may prolong the laser output cycle T using a manual switch (not shown) when the bar code reader is distant from the bar code label 6 and shorten it as the bar code reader approaches the bar code label 6. In automatic adjustment, the laser output cycle T may be shortened as the number of bars of the bar code which have been sampled (i.e., the number of numerical codes D1, as will be described later in detail, into which optically picked up bars and spaces of the bar code are converted) is increased. Specifically, in either case, when the bar code reader is distant from the bar code label, the laser output cycle T is set to a longer time interval, while as the bar code reader approaches the bar code label 6, the laser output cycle T is shortened to a time interval required for the laser beam to scan the bar code correctly. This allows the laser output cycle T to be set to a longer time interval when the bar code reader is distant from the bar code label 6 so that it is difficult to read the bar code correctly, thereby minimizing a power waste in the bar code reader.

The laser controller 14 is responsive to the operation start signal a outputted from the trigger switch 1 or the shock sensor 12 to provide a laser excitation signal c to the laser source 3 in cycles determined by the beam output cycle adjuster 13. The laser source 3 emits a laser beam to the mirror 5 cyclically. The mirror driver 4 is activated by the operation start signal a outputted from the trigger switch 1 or the shock sensor 12 and moves the mirror 5 to reflect the laser beam emitted from the laser source 3 so as to scan the bar code printed on the bar code label 6. The mirror 5 includes a polygon reflector or a flat reflector. The polygon reflector turns in a fixed direction to direct the input laser beam toward the bar code label 6 through a plurality of reflecting surfaces. The time required for one of the reflecting surfaces to rotate through a given angle, that is, a time interval between a start of reflection of the laser beam on one of the reflecting surfaces and a start of reflection of the laser beam on adjacent one of the reflecting surfaces is defined as one scan cycle, as shown in FIG. 2. The flat reflector swings at regular intervals to direct the input laser beam toward the bar code label 6 through a single reflecting surface. In this case, one of the swing intervals is defined as one scan cycle. The beam scan cycle detector 16 provides a scan cycle pulse signal b, as shown in FIG. 2, that rises from low to high level or falls from high to low level at each start of laser beam scans of the bar code label 6.

The bar code reading apparatus also includes an optical sensor 7, a binary-coding circuit 15, a counter 19, a code number comparator 21, a sampling clock generator 18, a sampling clock controller 17, and a reference number adjuster 20.

The optical sensor 7 consists of a photoelectric converter that converts an input laser beam reflected from the bar code label 6 into an electric analog signal according to the intensity of the input laser beam. The binary-coding circuit 15 converts the analog signal outputted from the optical sensor 7 into a digital signal d and stops the analog-to-digital conversions after receiving a decoding enable signal e outputted from the sample number comparator 21. The sampling clock controller 17 is responsive to the laser excitation signal c outputted from the laser controller 14 to provide a sampling clock control signal f to the sampling clock generator 18 and stops outputting the sampling clock control signal f for the scan cycles remaining in the laser on-duration in synchronism with a rising or falling edge of the scan completion pulse signal b which has been outputted from the beam scan cycle detector 16 immediately after the code number comparator 21 outputs the decoding enable signal e. The sampling clock generator 18 is responsive to the sampling clock control signal f outputted from the sampling clock controller 17 to supply clock signals to the counter 19. The counter 19 counts the clock signals supplied from the sampling clock generator 18 for a period of time corresponding to the pulse width of the digital signal d outputted from the binary-coding circuit 15 to provide a numerical code indicative of the width of one of bars or spaces between the bars of the bar code and outputs it to the CPU 22. The counter 19 also counts the number of numerical codes D1 derived in this scan cycle and provides it to the code number comparator 21. The counter 19 clears the numerical code and the number of numerical codes D1 each time the scan completion pulse signal b rises or falls, that is, one of the scan cycles is completed. The reference number adjuster 20 determines a reference number D2 based on the total number of bars and spaces between the bars printed on the bar code label 6 in response to a signal from the CPU 22. The reference number adjuster 20 is manually controlled through the CPU 22 to change the reference number D2 when the bar code is changed to another one having a different number of bars. The code number comparator 21 compares the number of numerical codes D1 with the reference number D2. If D1≧D2, then the code number comparator 21 provides a decoding enable flag and the decoding enable signal e to the CPU 22. Each of the number of numerical codes D1 and the reference number D2 may contain the number of start and stop codes in the bar code. For example, in the case where the reference number D2 does not contain the number of start and stop codes, but the number of numerical codes D1 contains it, the numerical codes derived in the counter 19 may be all dealt with as effective codes even if D1<D2.

The CPU 22 is responsive to the decoding enable signal e to decode the numerical codes provided by the counter 19 to output bar code information carried by the bar code label 6 and provides a reset signal g immediately before completion of the final scan cycle to clear a result of comparison in the code number comparator 21.

The operation of the bar code reader will be discussed below with reference to FIG. 2.

The laser output cycle T is, as described above, determined manually or automatically through the laser output cycle adjuster 13. In the shown example, the laser output cycle T is determined manually so that each of the laser on-duration and the laser off-duration may occupy the three scan cycles. The CPU 22 also controls the reference number adjuster 20 to determine the reference number D2 so as to agree with the total number of bars and spaces of the bar code printed on the bar code label 6.

When either of the trigger switch 1 and the shock sensor 12 is activated to output the operation start signal a, the laser controller 14 outputs the laser excitation signal c to the laser source 3, and the mirror driver 4 moves the mirror 5 to scan the bar code using the laser beam. Upon start of the scan, the beam scan cycle detector 16 outputs the scan cycle pulse signal b of high level.

When the laser beam reflected from the bar code label 6 enters the optical sensor 7, the optical sensor 7 converts it into the analog signal according to the intensity of the laser beam determined by the reflectivity of the bar or the space which has been scanned. The binary-coding circuit 15 binary-codes the analog signal outputted from the optical sensor 7 to provide the digital signal d to the counter 19.

The sampling clock controller 17 is responsive to the excitation signal c to output the sampling control clock signal f of high level to the sampling clock generator 18. The sampling clock generator 18 supplies the clock signals to the counter 19. The counter 19 converts the digital signals d outputted from the binary-coding circuit 15 during first one of the scan cycles within first one of the laser on-durations into the numerical codes and provides a signal indicating the number of the numerical codes D1 to the code number comparator 21.

The code number comparator 21 compares the number of the numerical codes D1 with the reference number D2 determined by the reference number adjuster 20. If the number of the numerical codes D1 meets the relation of D2>D1≧0, then the code number comparator 21 determines the numerical codes as trashy codes or incorrect codes which have been sampled from the middle of the first scan cycle and suspends output of the decoding enable signal e to the CPU 22. This precludes the CPU 22 from decoding the numerical codes sampled in the first scan cycle.

After completion of the first scan cycle, the scan completion pulse signal b falls from high to low level. Specifically, the second scan cycle in the first laser on-duration is entered, and the counter 19 clears the numerical codes and the number of the numerical codes D1.

The sampling clock controller 17 continues to output the sampling clock control signal f of high level. This causes the sampling clock generator 18 to continue to output the clock signals to the counter 19. Thus, when the optical sensor 7 picks up the bars and spaces of the bar code in the second scan cycle, the binary-coding circuit 15 converts them into the digital signals d and outputs them to the counter 19. The counter 19 converts the digital signals d into numerical codes and output the number of the numerical codes D1 to the code number comparator 21.

The code number comparator 21 compares the number of the numerical codes D2 sampled in the second scan cycle with the reference number D1. If the relation of D2>D1≧0 remains unchanged, then the code number comparator 21, similar to the first scan cycle, suspends output of the decoding enable signal e to the CPU 22.

After completion of the second scan cycle, the scan completion pulse signal b rises from low to high level, so that the third scan cycle in the first laser on-duration is entered. The counter 19 clears the numerical codes and the number of the numerical codes D1 determined in the second scan cycle.

In the shown example, the number of numerical codes D1 is still smaller than the reference number D2 in the third scan cycle. The code number comparator 21, similar to the first and second scan cycles, suspends output of the decoding enable signal e to the CPU 22.

Immediately before completion of the third scan cycle in the first laser on-duration, the CPU 22 outputs the reset signal g to the code number comparator 21. The code number comparator 21 clears the result of comparison in the third scan cycle.

After completion of the third scan cycle in the first laser on-duration, first one of the laser off-durations is entered. The laser controller 14 changes the laser excitation signal c from high to low level to deactivate the laser source 3. Simultaneously, the counter 19 clears all data held therein. The sampling clock controller 17 changes the sampling clock control signal f from high to low level to preclude the sampling clock generator 18 from outputting the clock signals.

The example of FIG. 2 illustrates for the case where the bar code is not read correctly until the first scan cycle of the fourth laser on-duration, for example, because the bar code reader still does not reach a location where it is possible to pick up the bar code correctly. The discussion below refers to the second scan cycle of the fourth laser on-duration in which the bar code has been first read in a correct form.

When the number of numerical codes D1 reaches the reference number D2 during the second scan cycle of the fourth laser on-duration, the code number comparator 21 determines that the numerical codes derived in this scan cycle are correct codes and outputs the decoding enable signal e of high level to the CPU 22. The CPU 22 then decodes the numerical codes outputted from the counter 19 and outputs a signal indicative of information carried by the bar code on the bar code label 6.

After completion of the second scan cycle, the sampling clock controller 17 changes the sampling clock control signal f from high to low level to preclude the sampling clock generator 18 from outputting the clock signals. Immediately before completion of the third scan cycle, the CPU 22 outputs the reset signal g to the code number comparator 21. The code number comparator 21 then clears the result of comparison and provides the decoding enable signal e of low level (i.e., a decoding inhibit signal) to the CPU 22 at the beginning of the fourth laser off-duration.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A bar code reader comprising:

a laser source that emits a laser beam;

a laser output cycle determining circuit that determines a laser output cycle consisting of a laser on-duration in which the laser source is allowed to emit the laser beam and a laser off-duration in which said laser source is inhibited from emitting the laser beam;

a scanner that scans a bar code using the laser beam emitted from said laser source to pick up bars and spaces between the bars of the bar code within the laser on-duration of the laser output cycle;

a code converting circuit that converts the bars and the spaces picked up by said scanner into numerical codes; and a decoding circuit that decodes the numerical codes provided by said code converting circuit to produce bar code information.

2. A bar code reader as set forth in claim 1, wherein said laser output cycle determining circuit is designed to change the laser output cycle in response to a signal provided manually.

3. A bar code reader as set forth in claim 1, wherein said laser output cycle determining circuit is designed to change the laser output cycle automatically according to a change in number of the numerical codes derived by said code converting circuit.

4. A bar code reader as set forth in claim 1, further comprising a shock sensor which senses contact of the bar code reader with an article with a bar code label on which the bar code is printed to turn on the bar code reader.

5. A bar code reader as set forth in claim 4, further comprising a switch designed to activate the bar code reader in response to a manually provided turn-on signal.

6. A bar code reader as set forth in claim 1, further comprising a code number comparing circuit that compares the number of the numerical codes derived by said code converting circuit with a reference number, when the number of the numerical codes is smaller than the reference number, said code number comparing circuit providing a decoding inhibit signal to inhibit said decoding circuit from decoding the numerical codes, when the number of the numerical codes is greater than or equal to the reference number, said code number comparing circuit providing a decoding enable signal to allow said decoding circuit to decode the numerical codes.

7. A bar code reader as set forth in claim 6, further comprising a reference number adjusting circuit that changes the reference number.

8. A bar code reader as set forth in claim 6, further comprising a scan cycle detecting circuit that outputs a scan cycle signal at each start of scan cycles of said scanner and a controlling circuit that prohibits said code converting circuit from converting the bars and the spaces picked up by said scanner into the numerical codes in response to first one of the scan cycle signals outputted from said scan cycle detecting circuit after said code number comparing circuit provides the decoding enable signal to allow said decoding circuit to decode the numerical codes.

9. A bar code reader, comprising:

a laser source that emits a laser beam;

a scanner that scans a bar code using the laser beam emitted from said laser source to pick up bars and spaces between the bars of the bar code;

a code converting circuit that converts the bars and spaces picked up by said scanner into numerical codes, said code converting circuit also determining the number of numerical codes;

a code number comparing circuit that compares the number of numerical codes determined bv said code converting circuit with a small reference number, when the number of the numerical codes is smaller than the reference number said code number comparing circuit providing a decoding inhibit signal, and when the number of the numerical codes is greater than or equal to the reference number, said code number comparing circuit providing a decoding enable signal;

a decoding circuit that is responsive to the decoding enable signal provided by said code number comparing circuit to decode the numerical codes and output signals indicative thereof, said decoding circuit being inhibited from decoding the numerical codes in response to the decoding inhibit signal; and, a laser output cycle determining circuit that determines a laser output cycle comprising a laser on-duration in which said laser source is allowed to emit the laser beam and a laser off-duration in which said laser source is inhibited from emitting the laser beam.

10. A bar code reader as set forth in claim 9, wherein said laser output cycle determining circuit is designed to change the laser output cycle in response to a signal provided manually.

11. A bar code reader as set forth in claim 9, wherein said laser output cycle determining circuit is designed to change the laser output cycle automatically according to a change in number of the numerical codes derived by said code converting circuit.

12. A bar code reader as set forth in claim 9, further comprising a shock sensor which senses contact of the bar code reader with an article with a bar code label on which the bar code is printed to turn on the bar code reader.

13. A bar code reader as set forth in claim 12, further comprising a switch designed to activate the bar code reader in response to a manually provided turn-on signal.

* * * * *